UNITED STATES PATENT OFFICE.

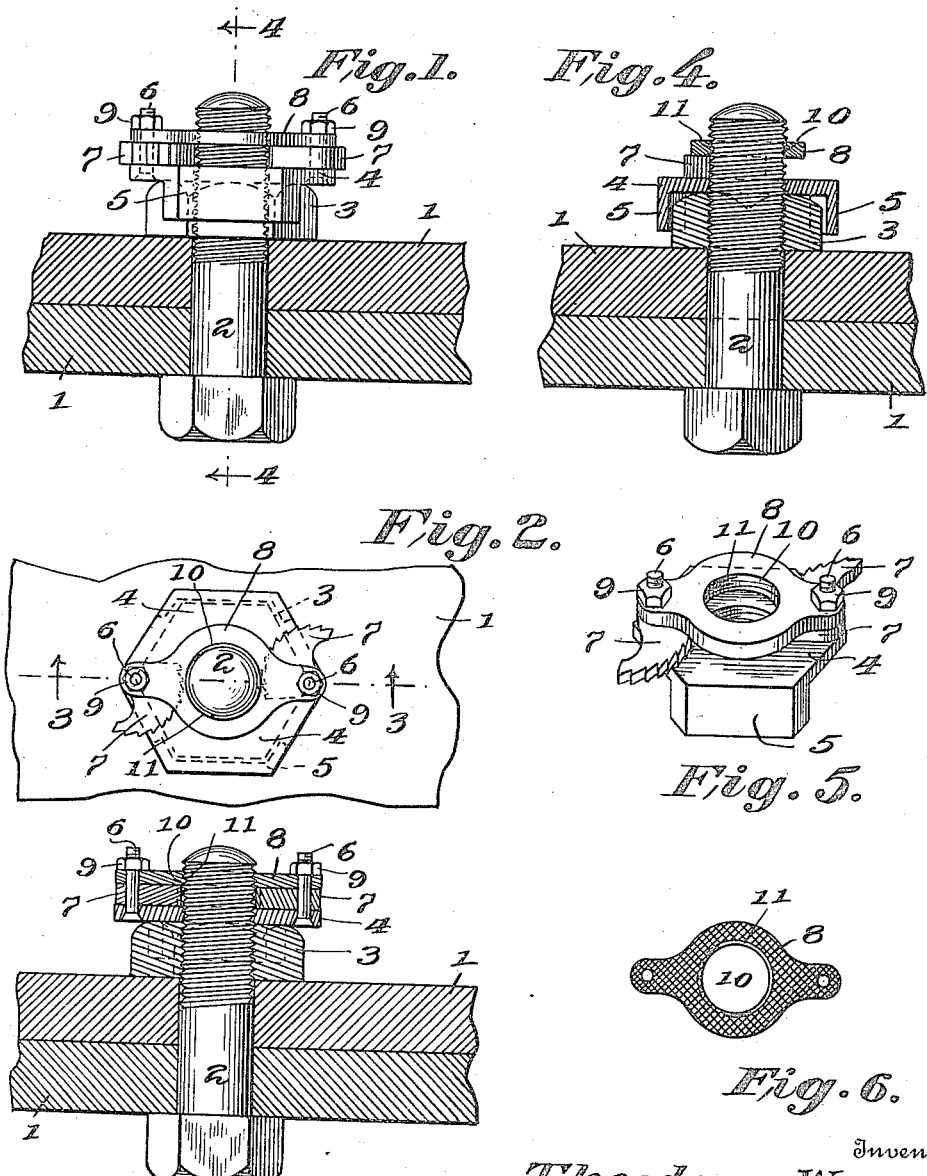

THEODORE WANG, OF ORMOND, FLORIDA.

NUT-LOCK.

1,216,190.

Specification of Letters Patent.  Patented Feb. 13, 1917.

Application filed May 19, 1916. Serial No. 98,627.

*To all whom it may concern:*

Be it known that I, THEODORE WANG, a citizen of the United States, residing at Ormond, in the county of Volusia and State of Florida, have invented new and useful Improvements in Nut-Locks, of which the following is a specification.

This invention relates to improvements in means for locking a nut upon a bolt, and the object of the invention is to produce an attachment which may be readily applied to any ordinary class of nuts which is provided with mechanism to engage with the shank of a bolt to prevent the accidental turning of the nut and bolt.

With the above and other objects in view the improvement resides in the construction, combination and arrangement of parts set forth in the following specification and falling within the scope of the appended claims.

In the drawing:

Figure 1 is a sectional view through a superstructure connected with a bolt and nut, said bolt and nut being locked in accordance with the present invention, Fig. 2 is an end view of the same, Fig. 3 is a sectional view approximately on the line 3—3 of Fig. 2, Fig. 4 is a sectional view approximately on the line 4—4 of Fig. 1, Fig. 5 is a perspective view of the attachment, and Fig. 6 is a plan view of the outer plate member looking toward the underface thereof.

In the drawing, 1—1 designates two plates which are attached by a bolt 2 that has screwed thereon a nut 3. My improvement contemplates the employment of a flat member or plate 4 which has side flanges 5 that are adapted to engage with at least two of the opposite sides of the nut 3. The plate may be shaped to conform to the shape of the nut and is provided at diametrically opposite points with outwardly extending studs 6—6 which provide the pivot members for cam-shaped dogs 7—7. These dogs have their inner or engaging faces toothed and are adapted to be swung into frictional contact with the threads of the bolt 2 when the nut is to be locked upon the bolt. The studs 6—6 may be in the nature of threaded elements, and the same passed through openings in the opposite ends of an outer plate 8. Preferably the inner face of the plate 8 is serrated or otherwise roughened so as to frictionally engage with the outer faces of the dogs 7—7 and if desired the studs 6—6 may have their outer ends threaded to receive nuts 9 which, when screwed tightly against the plate 8, will cause the same to bind upon the dogs and thus effectively retain the dogs in their locked engaging position. The outer plate 8 is provided with a central opening 10 to receive the threaded shank of the bolt 2 and this opening may be provided with threads 11 which co-act with the threads of the bolt.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. The combination with a bolt and a nut threaded thereon, of a plate having an opening to receive the bolt and flanges to engage with the sides of the nut, pivots extending from the plate, a cam-shaped dog for each of the pivots, each of said dogs having a toothed face to engage with the threads of the bolt, and an outer plate connecting the pivots and sustaining the dogs thereon and having an opening for the bolt.

2. In combination with a bolt having a nut threaded thereon, of a plate having an opening to receive the bolt and flanges to engage with the threads of the nut, pivot studs extending from the plate, a cam-shaped dog for each of the pivots, each of said dogs having a toothed face to engage with the threads of the bolt, an outer plate connected with the pivots and sustaining the dogs thereon, said outer plate having a bolt opening which is threaded and the said threads co-engaging with the threads of the bolt.

3. The combination with a bolt and a nut screwed thereon, of a plate having an opening through which the bolt passes and having flanges to engage with the sides of the nut, pivots extending from the plate, toothed dog members journaled upon the pivots adapted to be swung to engage with the threads of the bolt, and an outer plate having a central opening arranged upon the pivots and contacting with the dogs for holding the dogs in engaging position.

4. The combination with a bolt and a nut screwed thereon, of a plate having an opening to receive the bolt and being provided with flanges to engage with the sides of the nut, pivots extending from the plate, a cam-shaped toothed dog upon each of the pivots to engage with the threads of the bolts, an outer plate having an inner serrated face connected with the pivots, means upon said pivots for compressing the plate against the dogs, and said plate having a central threaded bolt opening which co-engages with the threads of the bolt.

In testimony whereof I affix my signature.

THEODORE WANG.

Copies of this patent may be obtained for five cents each, by addressing the "Commissioner of Patents, Washington, D. C."